No. 691,595. Patented Jan. 21, 1902.
J. D. CARTER.
FRUIT GATHERER.
(Application filed May 25, 1901.)
(No Model.)
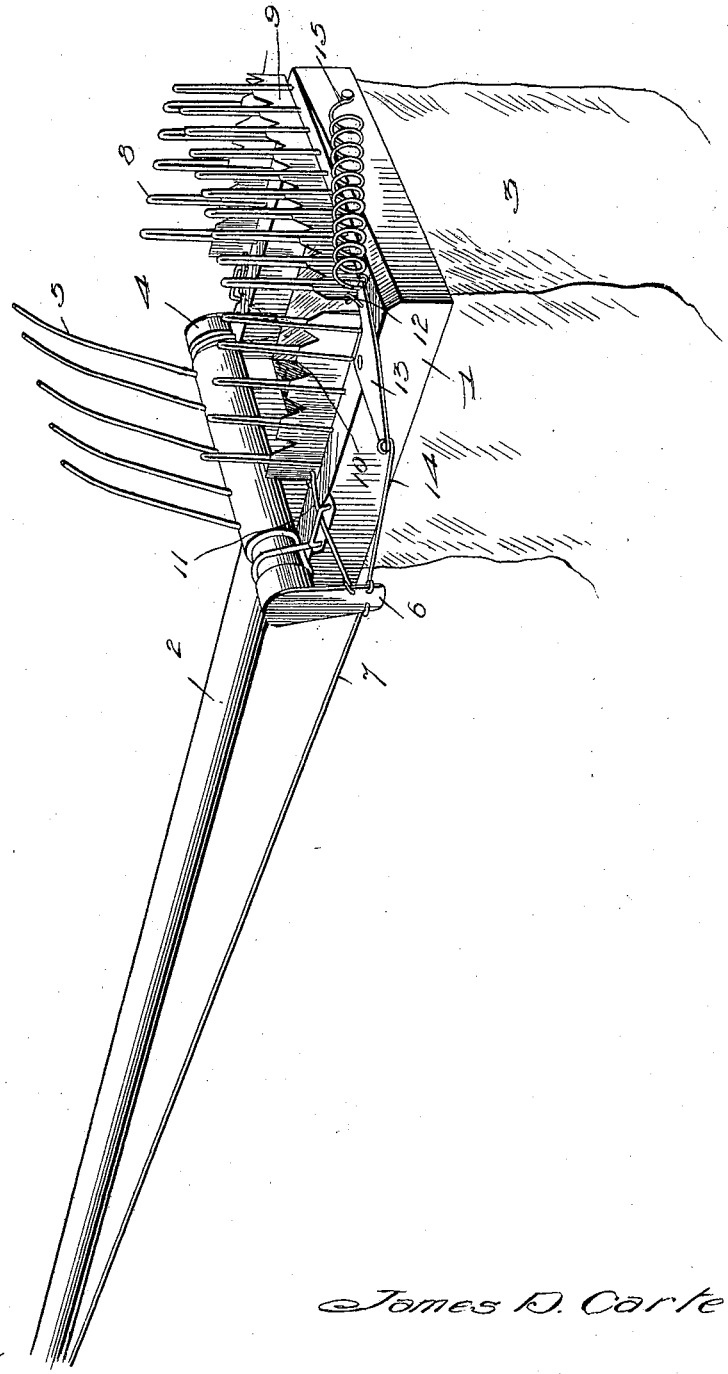
Witnesses
Inventor
James D. Carter,
By Victor J. Evans
Attorney

UNITED STATES PATENT OFFICE.

JAMES D. CARTER, OF BAKER CITY, OREGON.

FRUIT-GATHERER.

SPECIFICATION forming part of Letters Patent No. 691,595, dated January 21, 1902.

Application filed May 25, 1901. Serial No. 61,904. (No model.)

*To all whom it may concern:*

Be it known that I, JAMES D. CARTER, a citizen of the United States, residing at and whose post-office address is 1208 Chestnut street, Baker City, in the county of Baker and State of Oregon, have invented new and useful Improvements in Fruit-Gatherers, of which the following is a specification.

This invention relates to new and useful improvements in fruit-gatherers, and its primary object is to provide a device of simple construction, whereby the fruit may be securely grasped and its stem cut. A further object is to employ cutting mechanism of novel construction.

With these and other objects in view the invention consists in the novel construction and combination of parts, which will be hereinafter fully described and claimed.

In order that my invention may be fully understood, I will proceed to describe it with reference to the accompanying drawing, which shows a perspective view of my improved fruit-gatherer.

1 is a rectangular frame, to one side of which is secured a handle 2. A cloth sleeve 3 is secured to the four sides of the frame and extends downward therefrom to the operator. A roller 4 is journaled upon that side of the frame 1 to which the handle 2 is secured and wire tines or prongs 5 extend therefrom. An arm 6 is arranged at each end of the roller, and to one of them is secured a rod 7, whereby said roller may be turned.

Extending upward from the three sides of the frame 1 not occupied by the roller are prongs or tines 8, each of which is formed, preferably, of a length of wire bent upon itself, as shown. A sliding plate or cutter-bar 9 is arranged on edge upon each of the three sides of the frame before referred to, and these bars are slidably mounted between the lengths of the prongs 8. Wedge-shaped recesses 10, having sharpened edges, are formed in the upper edges of the bars 9, and these recesses are normally located between the prongs 8. The side bars 9 are connected to the arms 6 by rods 11, and the remaining bar 9 is connected by a rod 12 to a bell-crank lever 13, pivoted upon the frame 1. A rod 14 connects one end of this lever to one of the arms 6, and the opposite end of the lever is secured to a coiled spring 15, fastened to the frame 1.

The parts are normally in the positions shown in the drawing. In gathering fruit the stem is caught between two of the prongs 8 and seated in a recess 10. The rod 7 is then pulled, causing the prongs 5 to swing down and prevent the withdrawal of the fruit. At the same time the cutter-bars 9 will be moved longitudinally and the stem will be severed. The fruit will promptly fall into the sack, and as soon as the rod 7 is released the spring 15 will return the parts to their normal positions.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described my invention, what I claim as new, and desire to secure by Letters Patent, is—

1. The combination with a frame; of prongs extending from the sides thereof, cutter-bars slidably mounted on the sides, and means for operating the bars in unison.

2. The combination with a frame; of slotted prongs extending from the sides thereof, cutter-bars slidably mounted in the slots, a rod for operating the bars in unison, and means for returning the parts to normal position.

3. The combination with a frame, of a roller journaled on one side thereof, prongs extending therefrom, prongs extending from the frame, a cutter-bar slidably mounted upon the frame, and means for swinging the roller-prongs downward and operating the cutter-bar in unison.

4. The combination with a frame, of a roller journaled on one side thereof, prongs extending therefrom, prongs extending from the frame, cutter-bars slidably mounted upon the frame, an arm to the roller, a rod connecting said arm and one of the bars, a bell-crank lever upon the frame, rods connecting the ends of the lever to the roller-arm and a cutter-bar respectively, a spring secured to the lever and frame, and means for swinging the roller-arm.

In testimony whereof I affix my signature in presence of two witnesses.

JAMES D. CARTER.

Witnesses:
F. D. VINCENT,
H. J. WITHEY.